United States Patent [19]
Marsh

[11] Patent Number: 5,398,552
[45] Date of Patent: Mar. 21, 1995

[54] MAGNETIC FLOWMETER HAVING A SEPARABLE MAGNETIC ASSEMBLY

[75] Inventor: Lawrence B. Marsh, Buckeystown, Md.

[73] Assignee: Marsh-McBirney, Inc., Frederick, Md.

[21] Appl. No.: 141,029

[22] Filed: Oct. 26, 1993

[51] Int. Cl.$^6$ ............................................. G01F 1/00
[52] U.S. Cl. ................................. 73/861.12; 73/861.11
[58] Field of Search ........... 73/861.12, 861.15, 861.16, 73/861.17

[56] References Cited

U.S. PATENT DOCUMENTS

| | | |
|---|---|---|
| 3,372,589 | 3/1968 | Mannherz . |
| 3,885,433 | 5/1975 | Marsh . |
| 4,083,246 | 4/1978 | Marsh . |
| 4,195,515 | 4/1980 | Smoll ............................ 73/861.15 |
| 4,195,515 | 4/1980 | Smoll . |
| 4,236,410 | 12/1980 | Appel et al. .................... 43/861.12 |
| 4,346,604 | 8/1982 | Snook et al. . |
| 4,459,858 | 7/1984 | Marsh . |
| 4,726,236 | 2/1988 | Wada ............................ 73/861.16 |

Primary Examiner—Richard E. Chilcot, Jr.
Assistant Examiner—R. Biegel
Attorney, Agent, or Firm—Laubscher & Laubscher

[57] ABSTRACT

A magnetic flowmeter includes a flow tube that is connected in fluid-conducting relation between a pair of axially spaced sections of a conduit, a first electrical connector being fixed to the outer surface of the flow tube and including first terminals electrically connected with spaced internal electrodes, respectively, that contact the fluid flowing through the tube. A second electrical connector is provided for separable connection with the first connector, which second connector includes an end-fire electromagnet for establishing a transverse magnetic field in the flow tube via the first connector, and second terminals for connecting the electrodes with a flow-indicating meter via the first terminals, respectively, and a cable. In order to calibrate the meter for use with a plurality of flow tubes having different internal cross-sectional dimensions, respectively, the first and second connectors are provided with cooperating size coding and decoding devices, respectively.

10 Claims, 3 Drawing Sheets

MAGNETIC FLOWMETER HAVING A SEPARABLE MAGNETIC ASSEMBLY

STATEMENT OF THE INVENTION

A magnetic flowmeter apparatus includes a flow tube adapted for connection between a pair of axially-spaced sections of a fluid conduit, such as a waste supply or sewage waste removal conduit, which flow tube includes a fixed first electrical connector adapted for connection with a separable second connector, thereby to connect a flow-indicating meter with spaced internal electrodes carried by the flow tube for contact with the fluid conducted thereby. In order to permit use of the meter with a plurality of flow tubes having different cross-sectional internal dimensions, the second connector includes an end-fire electromagnet that establishes a transverse magnetic field in the flow tube via the first connector, the first and second connectors including cooperating size-coding and decoding means, respectively.

BRIEF DESCRIPTION OF THE PRIOR ART

Flowmeters for measuring the flow of fluid through a conduit are well known in the prior art, as shown, for example, by the Marsh U.S. Pat. Nos. 3,885,433, 4,083,246 and 4,459,858.

In the known Faraday-type electromagnetic flowmeters a transverse magnetic field is established in a direction normal to the longitudinal axis of a conduit, and a pair of electrodes in contact with the fluid within the conduit are diametrically arranged along a line normal both to the magnetic field and to the longitudinal axis of the conduit, whereby the velocity of flow is measured by a meter as a function of the potential difference across the electrodes.

In the prior patent to Mannherz U.S. Pat. No. 3,372,589, a side-saddle magnetic flowmeter is disclosed in which the magnetic field is produced within a relatively large pipe in a region which represents only a portion of the total cross-sectional area thereof. In order to provide an accurate reading of the flow rate through the pipe, the voltage induced in the region produces a signal that is multiplied by a factor that depends on the dimensional relationship of the region to the total cross-sectional area of the pipe.

In the patent to Smoll U.S. Pat. No. 4,195,515, a medical-type flowmeter system is disclosed in which an electromagnetic assembly is removably connected by connector means with a tubular member having electrodes mounted in a common transverse plane in contact with the fluid (i.e., blood) flowing through the tubular member. By using a plurality of tubular parts in an extracorporal circuit, measurements can be made at different points in the circuit by moving the magnet structure part from one tubular part to another.

The Snook et al U.S. Pat. No. 4,346,604 discloses a medical electromagnetic flowmeter having interchangeable housings and/or magnetic structures, use being made of alignment lugs that automatically effect a desired position and orientation of the lumen and electrode system relative to the magnetic structure. The reluctance of the magnetic circuit may be selectively altered by changing the position of an adjustment keeper, or a Hall probe may be provided for detecting the produced field and for increasing or decreasing the field strength to maintain predetermined values.

As distinguished from medical-type instruments for measuring the flow of blood, in the field of industrial process fluid flow such water-supply and waste-fluid removal flow measurement, the conduits are of relatively large size, and it is expensive to provide for each installation a separate flow-indicating meter that is calibrated in accordance with the size of the conduit. Furthermore, pipes or conduits of different internal dimensions have different flow characteristics, owing for example, to the high velocity of fluid flow near the center of the conduit, and a slower velocity near the wall of the conduit where the electrodes are relatively close to each other, so that the sensed velocity is not equal to the average or mean velocity of the flowing fluid. Additionally, as the fluid flows at a variety of velocities, this relationship between the sensed velocity and the mean velocity changes as a function of fluid velocity. Therefore, for reasonable accuracy there must be an ability to establish a fixed gain multiplier for each pipe size as it relates to sensed velocity vs. mean velocity, and there must be additionally, for situations where higher accuracies are required, the ability to have an addition correction factor multiplier that is a function of the velocity of the fluid.

Accordingly, the present invention was developed to provide an improved flow-measuring system wherein a single flow-indicating meter may be used to provide accurate flow measurements of fluid flow in a large number of conduits having different internal cross-sectional dimensions.

SUMMARY OF THE INVENTION

Accordingly, a primary object of the present invention is to provide an electromagnetic flowmeter that is automatically calibrated for conduit size upon connection with any one of a plurality of conduits having different internal cross-sectional dimensions, respectively.

A more specific object of the invention is to provide an electromagnetic flow measuring system including a flow tube that is connected in flow-transmitting relation between a pair of axially spaced sections of the conduit, first and second separable electrical connectors being provided for connecting internal electrodes carried by the flow tube with a flow-indicating meter, size-coding and decoding means being provided on the adjacent faces of the connectors for automatically calibrating the meter as a function of the internal cross-sectional dimensions of the associated flow tube. The code means may comprise fixed code tabs on one connector that operate corresponding code-reading switches on the other connector, or electrical terminals on one connector that are read by corresponding code-reading terminals on the other connector.

According to a further object of the invention, the transverse magnetic field in the flow tube is produced by an end-fire electromagnet mounted in the second electrical connector to direct flux laterally into the conduit via the first connector.

Another object of the invention is to provide a flow tube having spaced electrodes contained in a plane normal to the flow tube axis and in a sector of the tube having a sector angle less than 180°. The first electrical connector is fixed to the flow tube within the electrode sector, whereby the magnetic field flux is introduced to the flow tube via the electrode sector. A plurality of sets of electrodes may be arranged in sectors circumferentially spaced about the flow tube for taking measurements of different flow patterns within the flow tube, as might occur, for example, when the flow tube has a bent configuration producing a turn in the fluid flow.

BRIEF DESCRIPTION OF THE DRAWINGS

Other objects and advantages of the invention will become apparent from a study of the following specification when viewed in the light of the accompanying drawings, in which.

DETAILED DESCRIPTION

Figure 1:
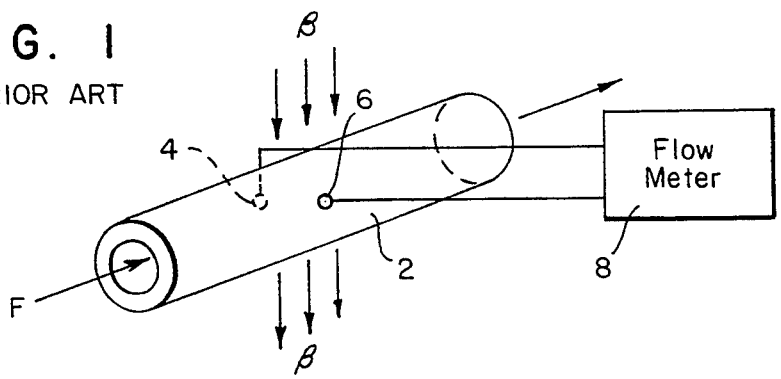
FIG. 1 is a schematic illustration of a flowmeter of the prior art.

Referring first more particularly to FIG. 1, the flowmeter system of the known Faraday-type electromagnetic flowmeter includes a conduit 2 through which the liquid fluid F is conducted, lines of flux $\beta$ extending normal to the longitudinal axis of the conduit for establishing a transverse magnetic field therein. Mounted in diametrically opposed relation along a line normal both to the magnetic field and to the longitudinal axis of the conduit are a pair of electrodes 4 and 6 arranged in contact with the fluid. A flowmeter 8 measures the potential difference across the electrodes 4 and 6, thereby to afford an indication of the velocity of fluid flow.

Figure 2:
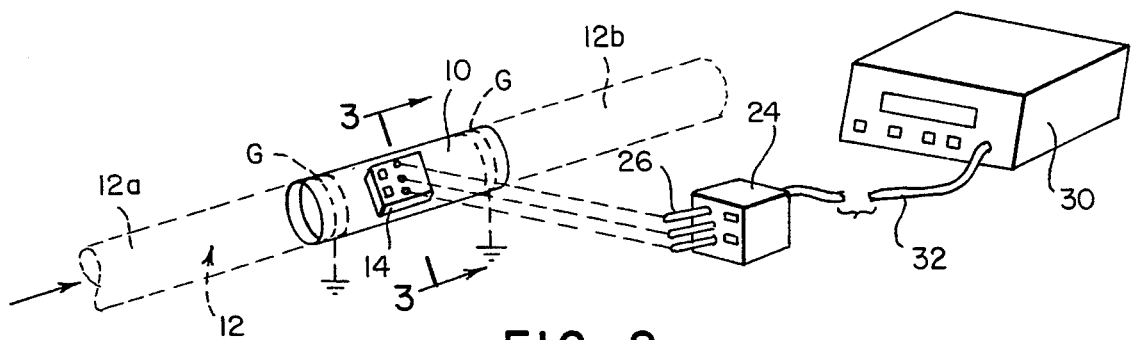
FIG. 2 is an exploded perspective view of the improved flowmeter apparatus of the present invention.
Figure 3:
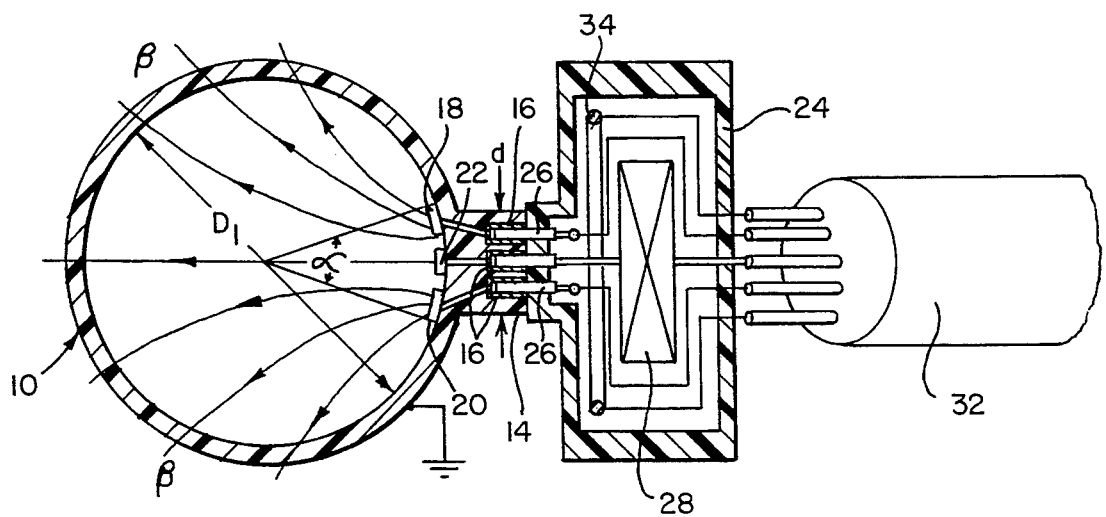
FIG. 3 is a detailed sectional view 3—3 of FIG. 2, illustrating the electrical connections between the connector elements.

Referring now to FIGS. 2 and 3, in accordance with the present invention, a tubular flow tube 10 is connected in fluid transmitting relation in an opening defined between a pair of axially-spaced sections 12a, 12b of the fluid conduit 12. Fixed to the outer circumference of the flow tube 10 is a first electrical connector element 14 having female terminals 16 connected with a pair of internal electrodes 18 and 20 mounted on the internal wall surface of the flow tube, and a neutral or ground electrode 22. Alternatively, the flow tube may be provided at opposite ends with grounding rings G, as shown in phantom in FIG. 2. A separable second electrical connector 24 is provided having male terminals 26 operable to engage in electrically-conducting relation the corresponding female terminals 16. Mounted within the second connector 24 is a so-called end-fired type electromagnet 28 that generates axially extending lines of magnetic flux $\beta$ directed laterally into the flow tube via the first connector 14. The male terminals 26 are connected with the flow-indicating meter 30 via cable 32. If desired, there may be provided within the second electrical connector 24 a Hall-effect coil 34 for transmitting to the meter a signal that is a function the magnitude of the magnetic field.

Figure 4:
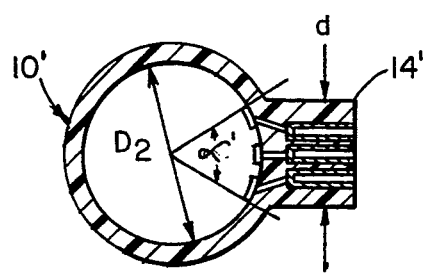
FIG. 4 is a sectional view taken through the connector element of a flow tube having a smaller internal diameter than that of the flow tube of FIG. 3.

As shown in FIGS. 2 and 3, the electrodes 18, 20 and 22 are contained in a plane that extends normal to the longitudinal axis of the flow tube 10, these electrodes also being arranged in a sector having a sector angle $\alpha$ that is less than 180°. Referring to FIG. 4, it will be seen that the second electrical connector 24 is adapted for connection with the first connector 14' of a flow tube 10' having a smaller internal diameter $D_2$ than the internal diameter $D_1$ (FIG. 3) of the first flow tube 10. Thus, both first connectors 14 and 14' have the same vertical dimension d, the sector angle $\alpha'$ of the embodiment of FIG. 4 being greater than the sector angle $\alpha$ of FIG. 3, owing to the smaller diameter of the flow tube 10'.

Figure 7:
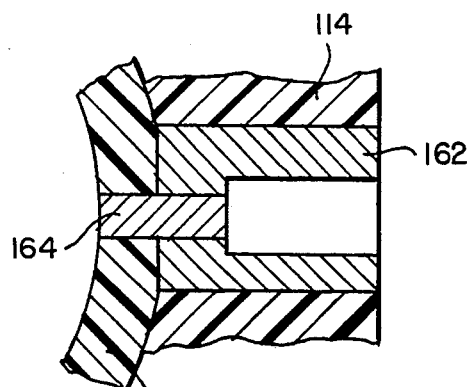
FIG. 7 is a detailed sectional view taken along the line 7—7 of FIG. 5.
Figure 10:
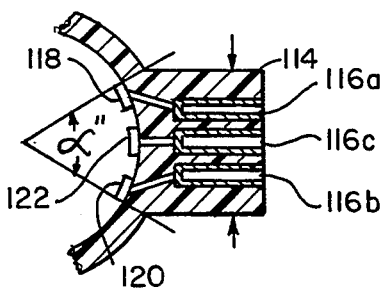
FIG. 10 is a sectional view taken along line 10—10 of FIG. 5.
Figure 5:
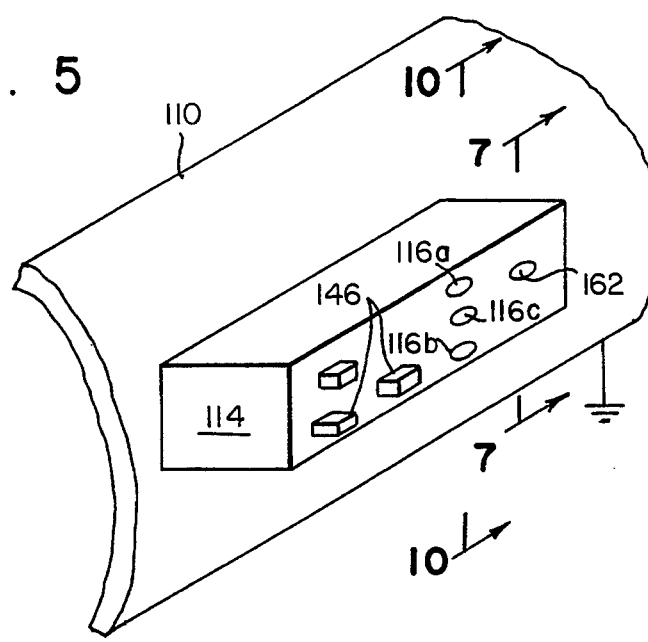
FIG. 5 is a detailed perspective view of the flow tube connector of the present invention.
Figure 6:
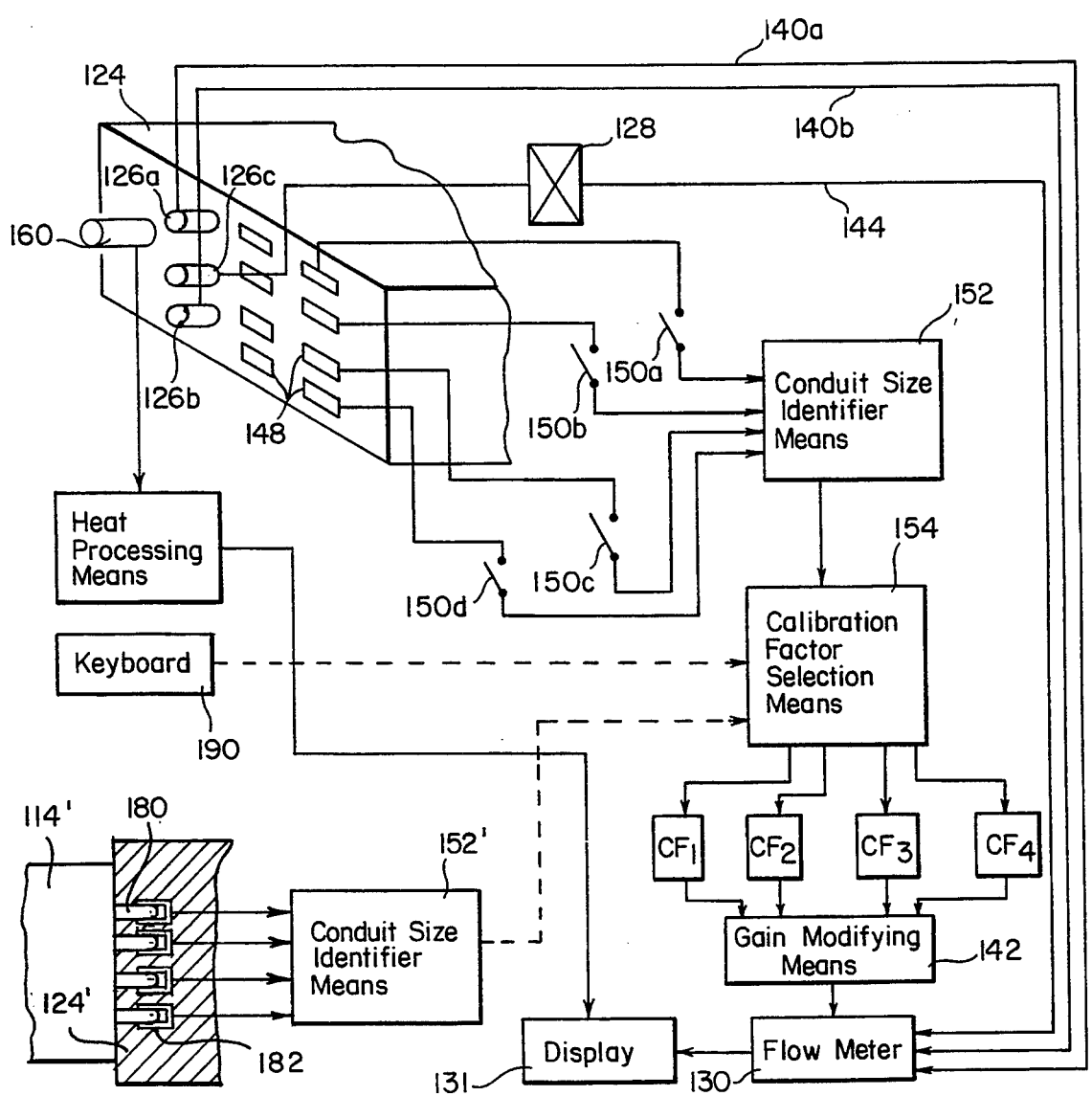
FIG. 6 is a detailed perspective view of the mating cable connector for use with the flow tube connector of FIG. 5.

Referring now to FIGS. 5–7, the first connector 114 is fixed to the outer circumferential surface of the flow tube 110 and includes terminals 116a, 116b and 116c connected with internal electrodes 118 and 120 and ground electrodes 122, respectively, and the second electrical connector 124 includes a pair of male terminals 126a and 126b that are connected with the flowmeter 130 via conductors 140a and 140b, respectively, and a ground terminal 126c connected with the flowmeter 130 via the end-fire electromagnet 128 contained within the second connector 124, and conductor 144. Flowmeter 130 is provided with conventional display or readout means 131.

In accordance with the present invention, the first electrical connector means 114 is provided with a plurality of stationary code tabs 146 the arrangement of which corresponds with the internal cross-sectional dimensions of the flow tube 110. Similarly, the corresponding end face of the second electrical connector 124 contains a plurality of openings 148 for receiving the code tabs 146 respectively, thereby to operate the appropriate normally-open switches 150a, 150b, 150c, 150d that are connected with the conduit size identifier means 152. In accordance with the size of the conduit determined by the conduit size identifier means 152, the calibration factor selector means 154 connects a corresponding calibration factor device $CF_1$, $CF_2$, $CF_3$, or $CF_4$ with the flowmeter 130 via gain modifying means 142, thereby to automatically calibrate the flowmeter 130 in accordance with the internal cross-sectional dimensions of the associated flow tube 110. If desired, a heat-sensing probe 160 may be provided on the second connector 124 that extends within a corresponding female receptacle 162 that is connected in heat-transmitting relation with the thermal probe 164 (FIG. 7) that is in contact with, and sensitive to the temperature of, the fluid flowing through the flow tube 110. Thus, the heat of the fluid as sensed by the probe 164 is transmitted by the male member 160 to the heat processing means 166, which sends the appropriate heat-responsive signal to the display 131 to adjust correspondingly the reading of the flow meter 130.

According to a modification of the invention, the first connector 114' may be provided with size-coded male electrical terminals 180 that cooperate with corresponding ones of a plurality of corresponding female electrical terminals 182 carried by the second connector 124', thereby to cause the conduit size identifier means 152' to supply the appropriate signal to the calibration factor selection means 154. Similarly, the cooperating size-coding and code-reading means on the electrical connectors may include corresponding size-coded resistors, memory chips, or simple electrical cross-connection coding/decoding means.

Thus, the second connector 124 is adapted for connection with the size-coded first connectors of a plurality of different flow tubes 110, having different internal cross-sectional dimensions, the code means 146 or 180 sending the appropriate signal to calibration factor selection means 154 to connect the appropriate calibration factor means $CF_1$–$CF_4$ to the amplifier means 142, whereby the flowmeter 130 is automatically calibrated in accordance with pipe size. Furthermore, the keyboard means 190 may be manually operated to supply the appropriate calibration input to the flowmeter 130.

Figure 8:
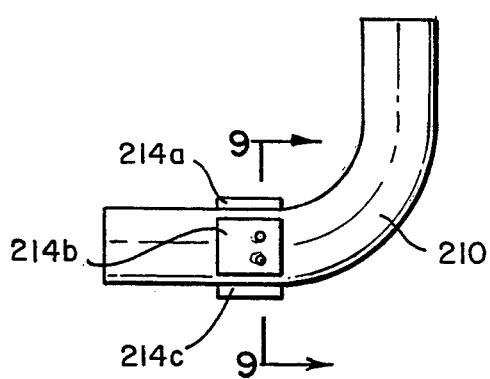
FIG. 8 is an elevational view of a second flow tube embodiment having a bent configuration.
Figure 9:
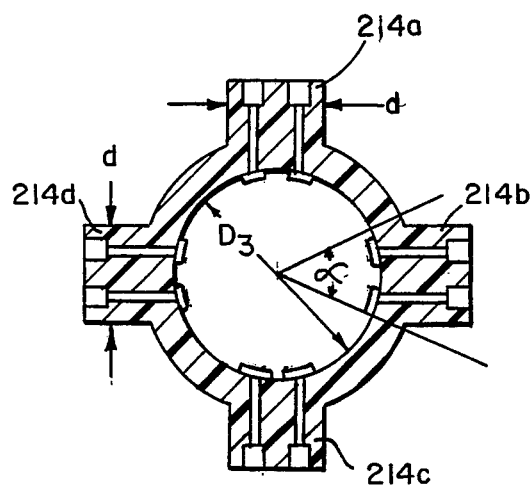
FIG. 9 is a sectional view taken along line 9—9 of FIG. 8.

Referring now to FIGS. 8 and 9, the flow tube 210 may be provided with a plurality of first connectors 214a, 214b, 214c and 214d arranged in circumferentially spaced relation on the outer surface of the flow tube. In this embodiment, the flow tube 210 contains a bend which would produce variations in the flow patterns which may be sensed by the electrodes associated with the various first connectors. All the connectors have the same size d as the connectors of the embodiments of FIGS. 3 and 4, whereby a common second connector may be selectively connected with the various first connectors to measure the flow patterns at various points on flow tube.

While in accordance with the provisions of the Patent Statutes the preferred forms and embodiments have been illustrated and described, it will be apparent to those skilled in the art that various changes and modifications may be made without deviating from the inventive concepts set forth above.

What is claimed is:

1. Flowmeter apparatus for measuring the flow of fluid in a conduit, comprising:
   (a) a flow tube (110) adapted for fluid-transmitting connection with an opening defined between a pair of axially spaced sections of the conduit, said flow tube having a longitudinal axis;
   (b) electromagnetic means (128) establishing a generally transversely directed magnetic field across a portion of said flow tube;
   (c) a plurality of spaced sensing electrodes (118, 120) supported by said flow tube for engagement with the fluid flowing in the conduit through said magnetic field, said sensing electrodes being contained in a plane normal to the axis of said flow tube;
   (d) an electrical flow-indicating meter (130);
   (e) means including separable connector means for connecting said electrodes with said meter, including:
      (1) a first electrical connector (114) fixed externally to said flow tube and including a plurality of first terminals (116a, 116b, 116c) connected with said electrodes, respectively; and
      (2) a second electrical connector (124) separably connected with said first connector, said second connector having a plurality of second terminals 126a, 126b, 126c) an electrical contact with said first terminals, respectively; and
   (f) calibrating means (154) including conduit size identifier means arranged on said separable connector means for automatically calibrating said meter as a function of the size of the internal cross-sectional dimensions of said flow tube, thereby to permit successive connection of said meter with a plurality of flow tubes having different internal cross-sectional dimensions, respectively.

2. Apparatus as defined in claim 1, wherein said sensing electrodes are contained in a sector of said flow tube having an angle ($\alpha$) less than 180°.

3. Apparatus as defined in claim 2, wherein said electromagnetic means comprises an end-fired electromagnet mounted in said second connector for directing magnetic flux ($\beta$) transversely into said flow tube via said first connector and said flow tube sector.

4. Apparatus as defined in claim 3, wherein said calibration means includes first code means mounted on said first electrical connector for producing a reading corresponding with the internal cross-sectional dimensions of said flow tube, and code readout means on said second electrical connector for reading the code of said first code means.

5. Apparatus as defined in claim 4, wherein said first code means includes a plurality of stationary tab means (146) on said first connector, and wherein said code read-out means includes a plurality of switches (150a–150d) mechanically operable between first and second conditions of conductivity by said tab means, respectively.

6. Apparatus as defined in claim 4, wherein said first code means includes a plurality of first electrical contacts (180) arranged on said first connector element as a function of the size of said flow tube, and wherein said code read-out means includes a plurality of second code contacts (182) arranged for engagement by said first code contacts, respectively.

7. Apparatus as defined in claim 4, and further including a first thermal sensing element (164) mounted in one of said flow tube lateral openings for thermal sensing contact at one end with the fluid in said flow tube; and further including a second thermal sensing element (160) mounted on said second connector element for engagement with said first thermal sensing element, and means for varying the operation of said flow meter as a function of the heat of the fluid as sensed by said first sensing element.

8. Apparatus as defined in claim 2, wherein a plurality sets of said electrodes are arranged on said flow tube in circumferentially spaced relation, thereby to provide a plurality of successive flow readings by a single meter at a plurality of circumferentially-spaced locations on said flow tube.

9. Apparatus as defined in claim 8, wherein said flow tube is curved to define a bend.

10. Apparatus as defined in claim 4, wherein said flow tube is straight.

* * * * *